(12) United States Patent
Lüchinger et al.

(10) Patent No.: US 7,531,759 B2
(45) Date of Patent: May 12, 2009

(54) DRAFT PROTECTION DEVICE FOR A BALANCE

(75) Inventors: Paul Lüchinger, Uster (CH); Hansjörg Rotach, Effretikon (CH); Roger Leisinger, Zurich (CH); Eduard Fringeli, Bubikon (CH)

(73) Assignee: Mettler-Toledo AG, Griefensee (CH)

( * ) Notice: Subject to any disclaimer, the term of this patent is extended or adjusted under 35 U.S.C. 154(b) by 891 days.

(21) Appl. No.: 11/185,765

(22) Filed: Jul. 15, 2005

(65) Prior Publication Data

US 2006/0016134 A1 Jan. 26, 2006

(30) Foreign Application Priority Data

Jul. 16, 2004 (EP) .................................. 04103407

(51) Int. Cl.
*G01G 21/28* (2006.01)
(52) U.S. Cl. .................. 177/180; 312/138.1; 312/223.1
(58) Field of Classification Search ................. 177/180, 177/181; 312/138.1, 223.1
See application file for complete search history.

(56) References Cited

U.S. PATENT DOCUMENTS

| 4,798,250 | A | 1/1989 | Knothe | 177/181 |
| 5,058,692 | A | 10/1991 | Melcher | 177/181 |
| 5,298,688 | A | 3/1994 | Luchinger | 177/181 |
| 5,584,365 | A * | 12/1996 | Tonna | 187/319 |
| 6,686,545 | B2 | 2/2004 | Luchinger | 177/180 |
| 6,844,507 | B2 | 1/2005 | Leisinger | 177/180 |
| 6,909,057 | B2 | 6/2005 | Aebi | 177/180 |

* cited by examiner

*Primary Examiner*—Randy W Gibson
(74) *Attorney, Agent, or Firm*—Standley Law Group LLP

(57) ABSTRACT

A draft protection device for a balance, which encloses a weighing compartment surrounding a weighing pan, has at least one opening that can be closed by a window. The at least one window has at least two slidable window sections which partially overlap each other in any of their positions. According to the invention, a drive mechanism is provided for the opening and closing of the window, which drive mechanism couples the window sections to each other in such a way that all of the window sections move simultaneously and at different speeds during the opening and closing, wherein a fixed ratio between the respective speeds of the window sections can be predetermined by design.

25 Claims, 9 Drawing Sheets

DRAFT PROTECTION DEVICE FOR A BALANCE

BACKGROUND

The invention relates to a draft protection device for a balance, wherein the draft protection device encloses a weighing compartment surrounding a weighing pan and has at least one opening that can be closed by a window. A balance of this type is used primarily in laboratories.

A draft protection device which is disclosed in EP 1 367 372 A1 has a draft-deflecting body consisting of at least two panel elements partially surrounding the weighing compartment of a balance in which the weighing pan is arranged. The body is designed to be handled as a separate part which can be set on the balance in at least two different positions, providing in each of the different positions at least one opening for access to the weighing compartment. The user can position the body in such a way that the respective openings associated with the different positions allow access to the weighing compartment from different directions. The body can be arranged either immediately on a balance housing containing the weighing cell and associated electronics, or it can be arranged on a base which can be set in place on the balance housing. In the latter case, the base forms the floor of the weighing compartment. As a further element of the draft protection device, the base can be equipped with at least one fixed wall which can, for example, form the rear wall of the weighing compartment.

A balance that is described in EP 1 351 041 A2 has a draft protection device with at least two slidable walls for opening and closing the weighing compartment, wherein the arrangement includes a slidable connector body that serves to connect slidable walls that are not bordering on each other. The concept further includes push handles that are designed for coupling or releasing the connection of one slidable wall to another slidable wall, or of a slidable wall to the connector body. A push handle of this kind is formed of handle elements cooperating with each other as a pair, where the respective elements of a pair are attached to adjacent slidable walls, or to the connector body and a wall that is adjacent to it, and where each of the elements of a pair by itself is designed as a handle for sliding the respective wall or the connector body. A first element of each pair is configured with a recess into which the second element can be folded by a swivel motion of the first and/or second handle element so as to couple the handle elements together into a pair, wherein the pair of elements together in their combination as a push handle have an outside contour shape and size essentially equal to the first handle element with the recess.

A cylindrical draft protection device for a balance which is disclosed in U.S. Pat. No. 4,798,250 consists of at least two wall segments, with all of the wall segments being movable relative to each other by means of a motor. The wall segments can be moved individually, or they can be coupled to each other so that they move synchronously.

A draft protection device with movable wall elements that can be moved by a motor is described in U.S. Pat. No. 5,058,692. The motor can be operated with at least two different speeds, so that an individual wall element of the draft protection device can be moved fast in an initial phase of opening or closing, and slower in a second phase prior to reaching a programmable end position.

Another balance with a draft protection device is described in EP 0 556 473 A1, wherein at least one of the openings of the draft protection device can be closed by a window which is divided into at least two window sections that are guided along their travel path by a pair of parallel track grooves running next to each other. Attached to the edges of the window sections are take-along devices, so that when a first window section is moved, the second section of the same window will be dragged along. This concept prevents the problem where a significant portion of a window panel protrudes beyond the balance housing or can even get jammed in its track when the access portals of the draft protection device are completely opened. In the open condition of the weighing compartment, the window sections lie stacked on each other or are positioned next to each other.

The latter arrangement of a window in a balance according to EP 0 556 473 A1, where one window section automatically drags along a further window section by means of take-along devices, creates a problem with the jolts from the abrupt starting and stopping of the further window section at the moment when the take-along devices of the respective window sections come into contact with each other.

SUMMARY

Consequently, the present invention has the objective to ensure a jolt-free as well as smoothly operating opening and closing movement for the draft protection device of a balance with at least one window that has at least two window sections which are slidable relative to each other.

A solution is offered for a balance with a draft protection device that encloses a weighing compartment surrounding a weighing pan and has at least one opening that can be closed by a window. The at least one closable window has at least two slidable window sections which in any position partially overlap each other. According to the invention, a drive mechanism is provided for opening and closing the at least one window, wherein the window sections are coupled to each other in such a way that all of the window sections move simultaneously and at different speeds during the opening and closing, wherein a fixed ratio between the respective speeds can be predetermined in the design.

A draft protection device equipped with this drive mechanism allows the windows to be opened and closed gently and without jolts. Take-along devices as known from the prior art, particularly of the kind that are arranged at the overlapping edges of the window sections, are no longer required. Thus, a window configured in accordance with the present invention has no flanges obstructing the view into the weighing compartment.

The respective opening and closing speed of each window section depends on its position in the closed condition of the window. By design, the respective speeds of the window sections decrease in the order of the respective closed positions of the window sections in the direction of the movement for opening the window, beginning from the side of the balance that is normally oriented towards the user, i.e., from the front side.

The respective opening and closing speeds of the window sections are in particular in the same ratio to each other as the respective distances that the window sections have to travel between the completely closed position and the completely open position of the window and vice versa.

It is of particular advantage if the draft protection device includes a roof portion with a top opening that can be closed by a top window, and if it also includes at least one lateral opening that can be closed by a side window, wherein the sections of at least one side window are suspended in a guiding device. The guiding device is arranged close to the roof portion, preferably in an enclosed cage. This cage can also contain the drive mechanism for the at least one side window and, in a particularly advantageous further developed embodiment of the invention, it can at the same time serve as a guide for the top window.

With the concept of arranging the guiding device for the side window sections at the top of the balance and in a substantially enclosed cage, the risk of dirt settling in the guiding device and the drive mechanism is to a large extent avoided.

The drive mechanism in a preferred embodiment of the invention includes a pinion gear, a fixed, housing-mounted rack, and a rack that is connected to a window section, with the pinion gear being in meshing engagement with both racks. Alternatively, the drive mechanism can also have a drive belt, a spur belt, or a rope and pulley arrangement.

The window sections are guided and supported in the guiding device by wheels that are connected to the window sections. In an advantageous configuration of the concept, the wheels roll on a ledge inside the cage. Keeping the guiding constraint substantially free of loose play prevents the risk that the relatively narrow window sections could become jammed in a skewed position.

With the suspended arrangement of the window sections, no special guiding device is required at the bottom edge. It has been found to be practical to arrange constraining elements at the top of a base or on the balance housing itself in order to keep the window sections from swinging sideways relative to the plane of the window.

In another embodiment of a balance with a draft protection device according to the invention, the window sections have a further guiding device in the lower part of the balance. The further guiding device is designed to allow a window to be controlled from the opposite side of the balance and/or to allow both windows to be opened or closed simultaneously from one side of the balance. With the suspended arrangement of the window sections, the further guiding device can be designed so that none of its parts protrude beyond the balance housing when the side windows are in the fully opened position. This counteracts a tendency to collect dirt. Materials which in the weighing process have fallen to the floor of the weighing compartment are easily swept out, for example with a cloth, without getting trapped in the lower guiding device of the window sections.

Guiding the window sections of the side windows along their upper edges in the cage has the particular advantage that the window sections are not exerting a force against the lower guiding device. This promotes the jolt-free and smooth-running opening and closing of the side windows.

A window of the draft protection device can have two, three or more window sections. In particular for the purpose of cleaning, the window sections can be taken out of the guiding device. As an alternative, it is also possible that the entire guiding device together with the connected side windows can be removed from the draft protection device in a similar way as described in EP 1 195 585.

The drive mechanism of the draft protection device includes a gearbox, more specifically a gear-ratio mechanism and can be configured for manual as well as motor-powered opening and closing of a window.

The invention is described hereinafter by way of examples which are shown schematically simplified in the drawings, wherein:

BRIEF DESCRIPTION

Figure 1:
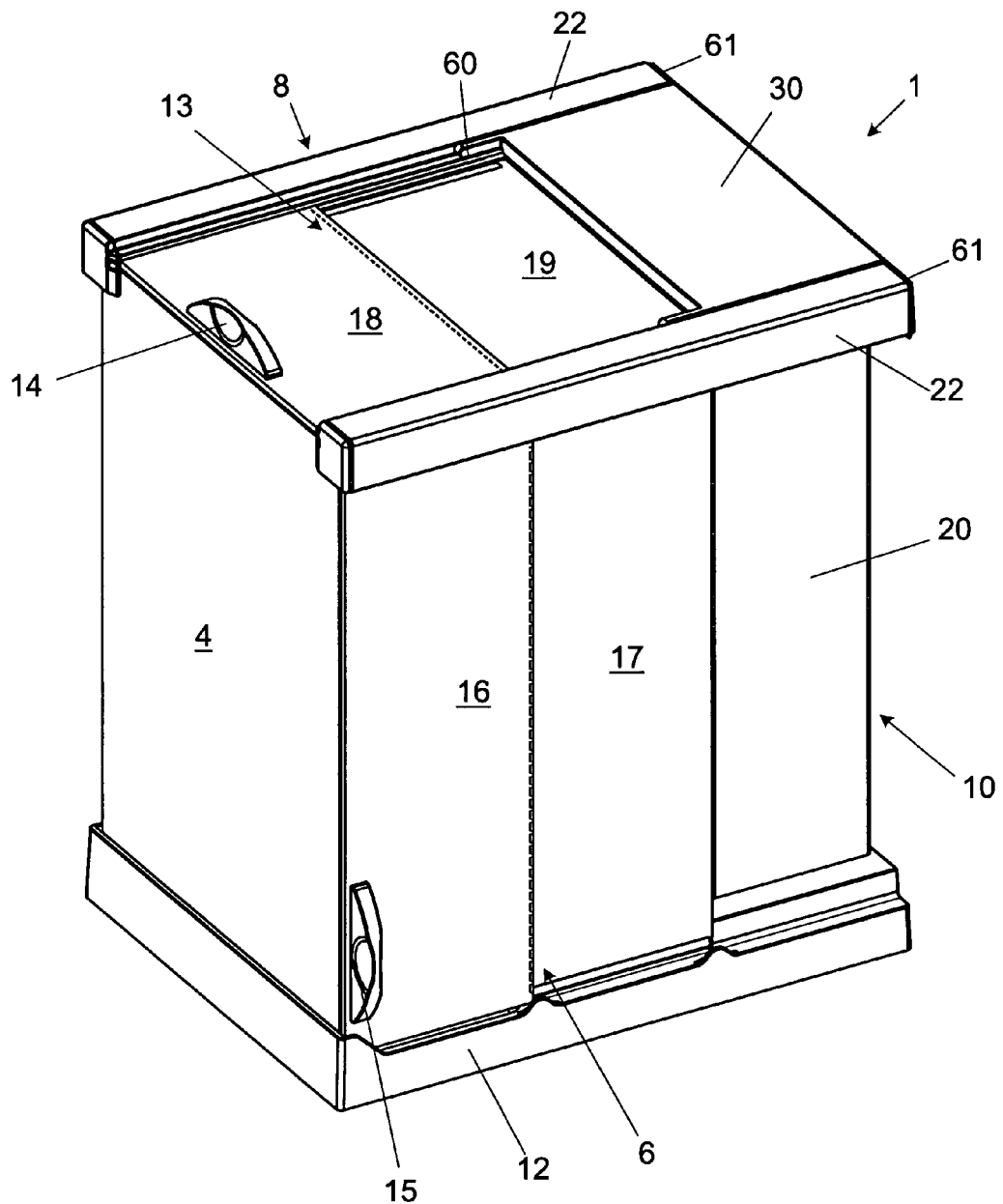
FIG. 1 represents a perspective view of a draft protection device for a balance with a closed weighing compartment.

In the three-dimensional representation of FIG. 1, a draft protection device 1 for a balance which encloses a weighing compartment is shown under an oblique viewing angle from the front. The draft protection device 1 is composed of a front wall 4, two windows 6 closing off lateral openings of which only the one facing the viewer can be seen in the drawing, and a roof portion 8 as well as a rear compartment 10 which forms the rear wall of the weighing compartment. The draft protection device 1 further includes a base 12 which can be seated on a balance housing (not shown) containing the weighing mechanism. The base 12 can be connected to the balance housing by means of holders, or it can also be integrated in the balance housing. A draft protection device with a base that is designed to be positioned on a balance housing is disclosed in the previously cited reference EP 1 367 372 A1. The window 6 as well as the front wall 4 are preferably made of glass. Alternatively, the windows 6 or the front wall 4 can be formed of a transparent polymer material with an electrically conductive coating, in which case specific measures are taken to connect the conductive coating to the electrically conductive parts of the balance.

Integrated in the roof portion 8 is a top window 13 which can be opened by sliding in the direction towards the rear compartment 10 and which likewise consists preferably of glass or a transparent polymer material with a conductive coating. The user can slide the top window 13 by pushing or pulling on the handle 14. The roof portion 8 includes a cover 30 pivoted on a hinge 60 to close off the top of the rear compartment 10. The side windows 6 can be opened and closed by means of the handles 15, analogous to the opening and closing of the top window 13. Each of the side windows 6 as well as the top window 13 has two window sections 16, 17, 18, 19. When the windows 6, 13 are opened and closed—and this applies in particular to the side windows 6—the two window sections move together at the same time, overlapping each other in every position (indicated by the broken lines in FIG. 1). In the completely open position, as shown in FIG. 2 for one of the two side windows 6, the two window sections 16, 17 form a stack and cover the side wall 20 (see FIG. 1) of the rear compartment 10.

Figure 2:
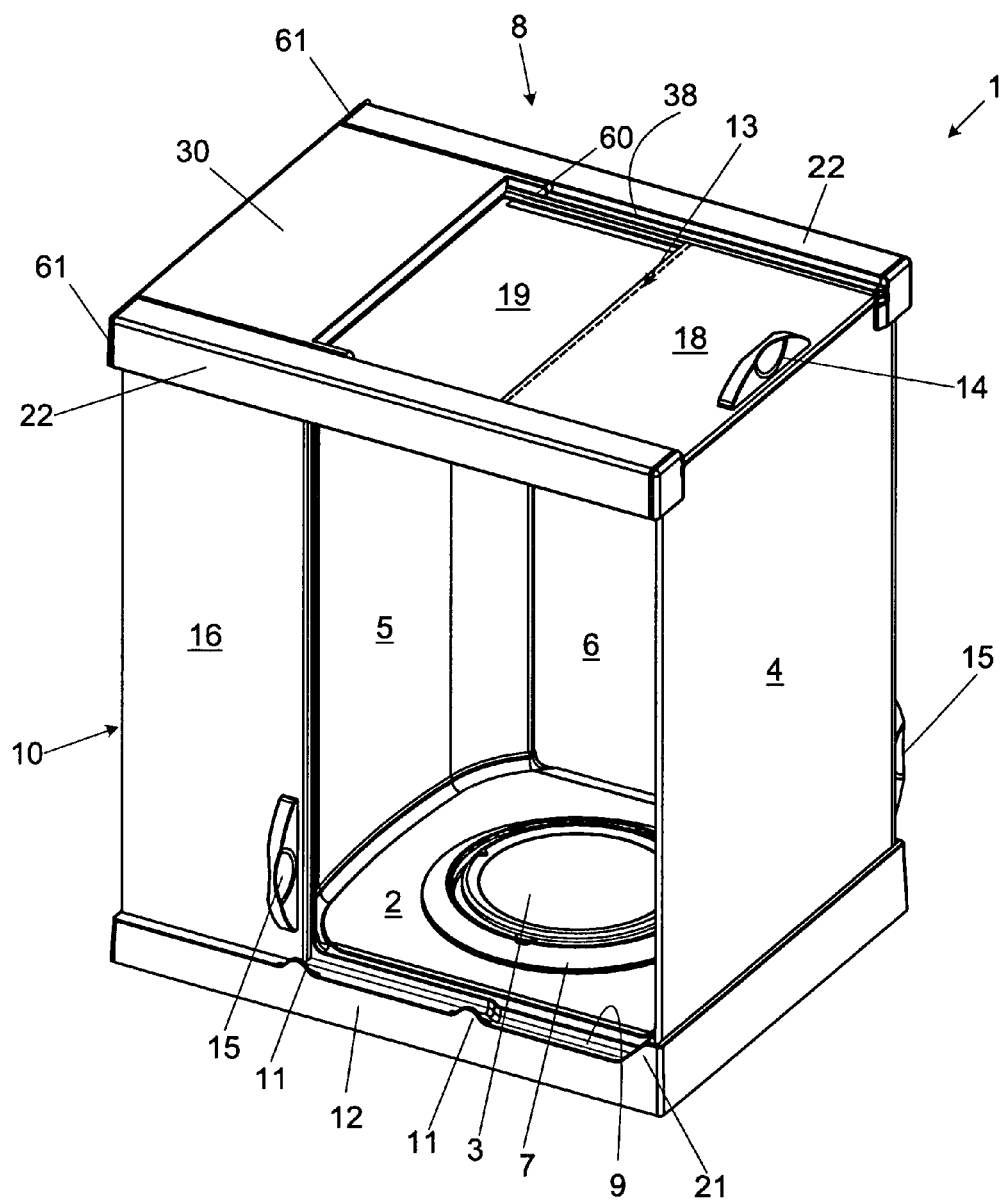
FIG. 2 represents a perspective view of the draft protection device of FIG. 1 with the weighing compartment opened on one side.

The representation of the draft protection device 1 in FIG. 2 allows the viewer to see inside the weighing compartment, showing the rear wall 5 and the weighing compartment floor 2 which is formed by the base 12. Likewise within view in FIG. 2 is the arrangement of a weighing pan 3 that is surrounded by a draft protection ring 7. The base 12 has a passage opening for a load-transmitting member (not shown in FIG. 2) which connects the weighing pan 3 to the weighing cell (likewise not shown).

As FIG. 2 further illustrates, the base 12 has a laterally projecting ledge 9 with two ridges 11 at its outside edge standing up from the base 12 and serving to guide the movement of the window sections 16, 17. At the front side, i.e., the side which during operation normally faces the user, the wall of the base rises above the level of the weighing compartment floor 2 to serve on the one hand as a mount for the front wall 4, and on the other hand as a forward stop for the window section 16. The rise at the front of the base continues on the side in a tapered-down portion 21 that meets the lateral ledge 9 and serves as a further guiding constraint for the window section 16.

The window sections 16, 17 are guided along their top edges by being suspended in one of the cages 22 (see FIGS. 1 and 2) which are arranged on both sides of the draft protection device 1. The cages 22 contain a guiding device as well as the drive mechanism of the window sections 16, 17. In addition, there are track grooves 38 arranged on the sides of the cages to guide the window sections 18, 19 of the top window 13 of the roof portion 8.

Figure 3:
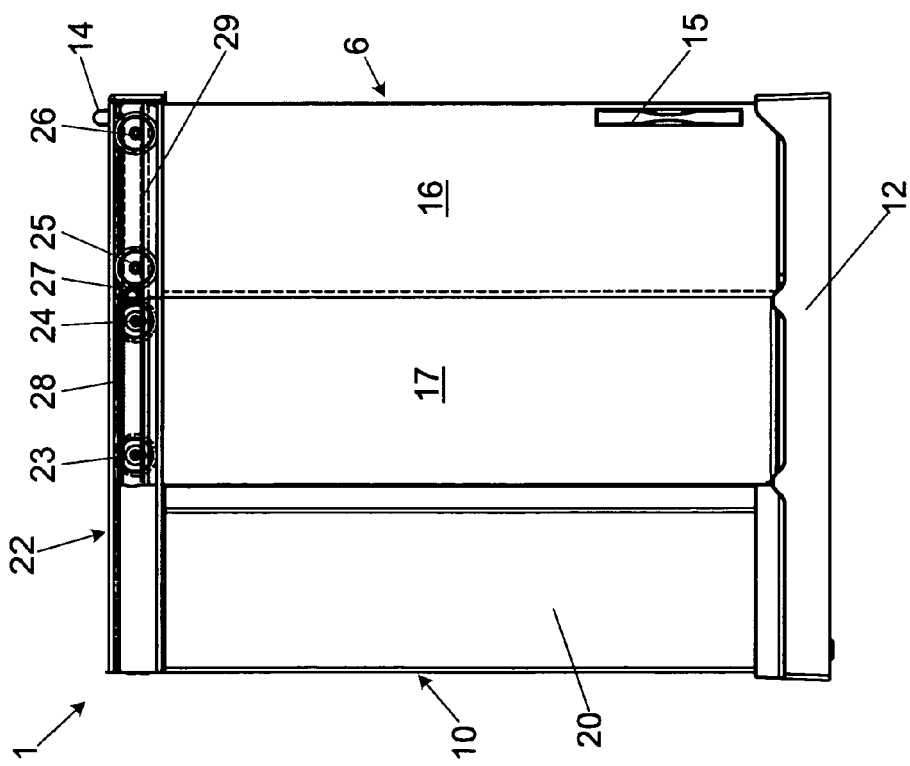
FIG. 3 represents a side view of the draft protection device of FIG. 1 with the side window in the closed position.

FIG. 3 gives a side view of the draft protection device 1 with the side window 6 closed. The cage 22 is drawn with the side cut off to open the view at the guiding device and the drive mechanism. The window sections 16, 17 have wheels 23, 24, 25, 26 near the corners of their top edges. The respective wheels of each window section run on a ledge inside the cage 22, thus providing a stable suspension of the window sections 16, 17 in the cage 22, as will be further explained hereinafter in the context of FIGS. 7 and 7*a*. Connected to the window section 17 is a pinion gear 27 which is in meshing engagement with an upper rack 28 and a lower rack 29 to tie the movements of the window sections 16, 17 to each other.

Figure 4:
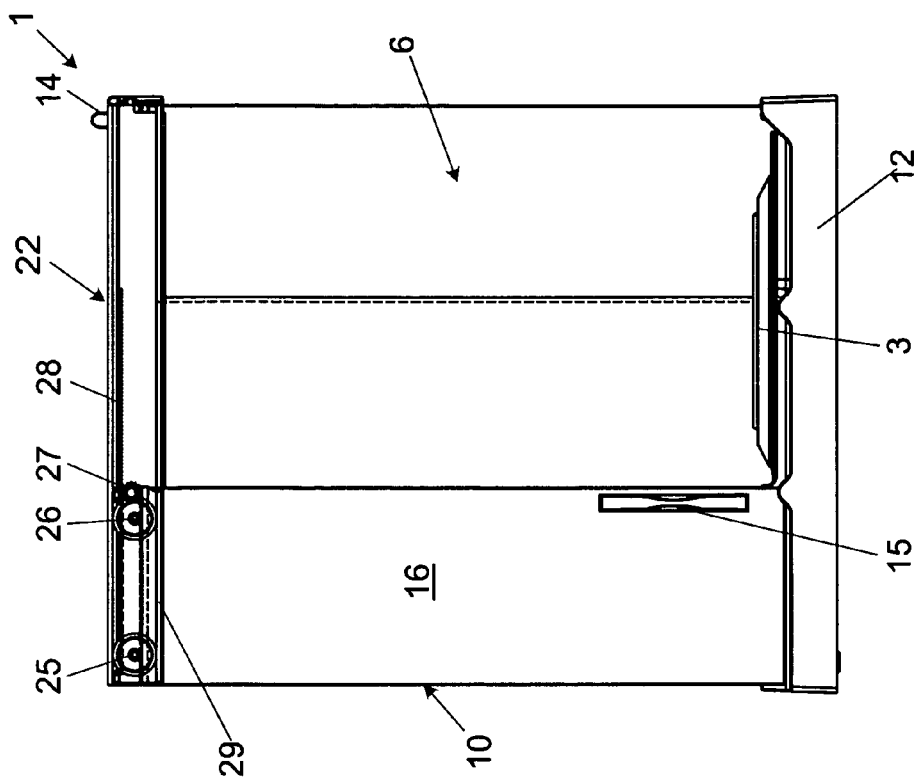
FIG. 4 represents a side view of the draft protection device of FIG. 2 with a side window in the fully opened position.

FIG. 4 shows the draft protection device 1 seen from the same side as in FIG. 3, in this case with the side window 6 open. FIG. 4 opens the view at the weighing pan 3 and the closed window 6 on the opposite side. The two window sections 16, 17 are positioned on top of each other so that they form a stack covering the side wall 20 of the rear compartment 10. In this position, only the window section 16 remains exposed to the viewer. When moving the two window sections 16, 17 to the position shown in FIG. 4, the pinion gear 27 moves along the rack 28 so that it ends up at the rear end of the rack 28.

Figure 5:
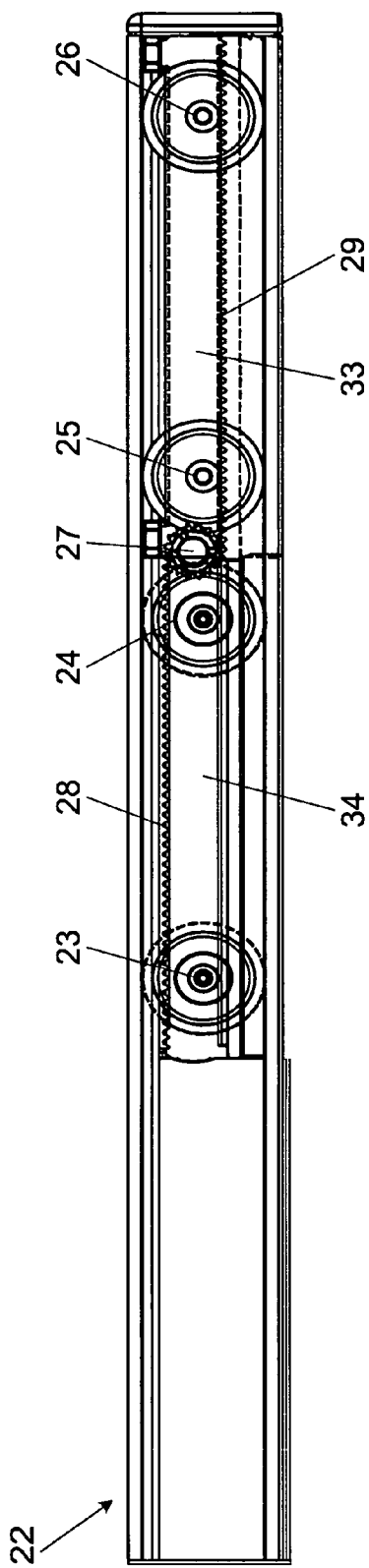
FIG. 5 represents an enlarged detail of FIG. 3, giving a side view of the cage in which the window sections are guided.
Figure 6:
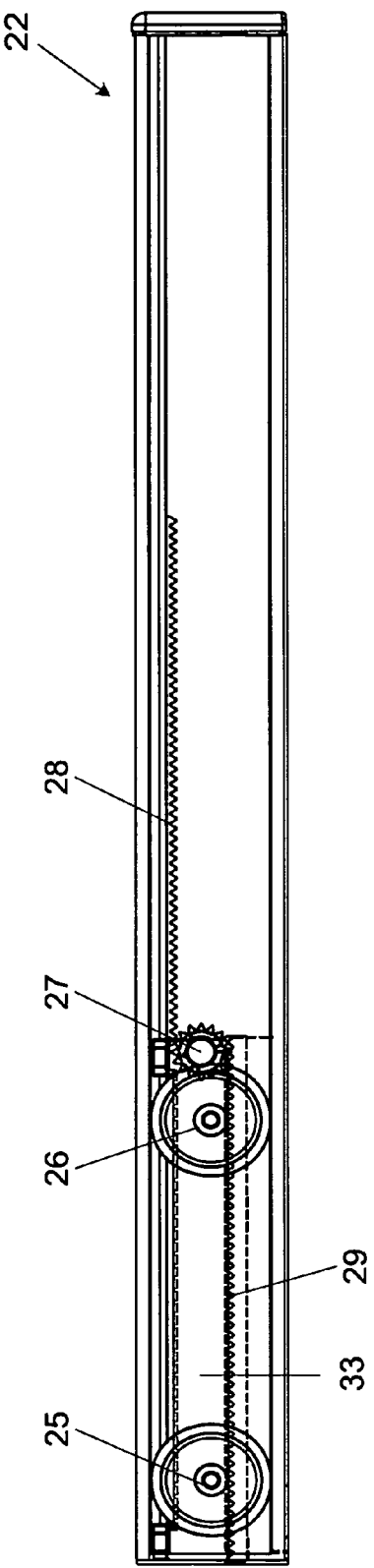
FIG. 6 represents an enlarged detail of FIG. 4, giving a side view of the cage in which the window sections are guided.

FIGS. 5 and 6, which are enlarged representations of the views of the cage 22 shown, respectively, in FIGS. 3 and 4, will help to explain the function of the drive mechanism of the two window sections 16, 17. FIG. 5 illustrates the arrangement of the pinion gear 27 in relation to the racks 28, 29 in the closed state of the window 6, while FIG. 6 illustrates the situation in the completely open state of the window 6. In the closed position (FIG. 5), the pinion gear 27 engages the forward end of the rack 28 and the rear end of the rack 29. Conversely in the open position (FIG. 6), the pinion gear 27 engages the rear end of the rack 28 and the forward end of the rack 29. The terms "forward" and "rear" in this context mean, respectively, "oriented towards the front wall 4" and "oriented towards the rear compartment 10". The rack 28 is in fixed connection with the cage 22 arranged in the middle of the latter, while the rack 29 is in fixed connection with the window section 16, and the pinion gear 27 is arranged at the front corner of the window section 17. The racks 28, 29 are of the same length. When a window 6 is opened by pushing the window section 16 towards the back by the handle 15 (see FIGS. 3 and 4), the meshing engagement of the rack 29 with the pinion gear 27 will cause a rotating movement of the pinion gear 27. Since the pinion gear 27 is at the same time engaged in the rack 28, it will roll along the rack 28, which causes the pinion gear 27—as well as the window section 17 to which it is connected—to move at a speed that equals one-half of the speed at which the rack 29 and its connected window section 16 move in relation to the rack 28. In other words, the ratio between the respective speeds of the window section 16 and the window section 17 equals the ratio between the diameter and the radius of the pinion gear 27, i.e., 2:1.

Figure 7:
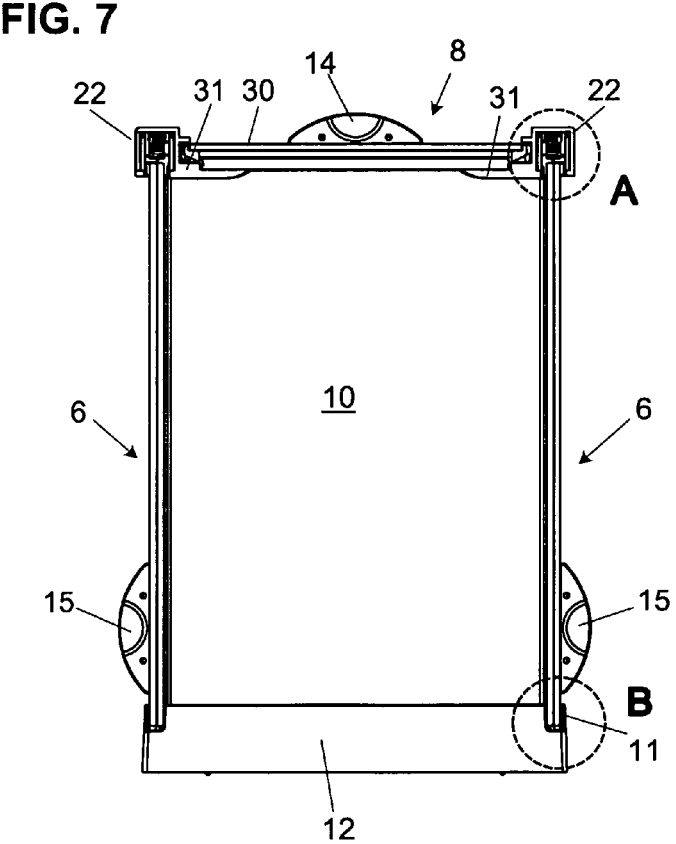
FIG. 7 represents a rear view of the draft protection device of FIG. 1.

FIG. 7, which represents a rear view of the draft protection device 1, illustrates how the window sections 16, 17 of the two side windows 6 are guided in the cage 22, and it also shows the arrangement at the bottom of the draft protection device 1 where the window sections 16, 17 are guided only by the upstanding ridges 11. For the sake of clarity, the two cages 22 are shown open at the end facing the viewer. This situation occurs when the cover 30 is folded over to the front, in which case the window sections 16, 17, 18, 19 can be taken out of the draft protection device 1 for cleaning. When the cover 30 is in the closed position, it closes off the rear end of the cages by means of the skirt 61 (see FIGS. 1 and 2) and thereby provides a rearward stop for the window sections 16, 17, 18, 19.

Figure 7A:
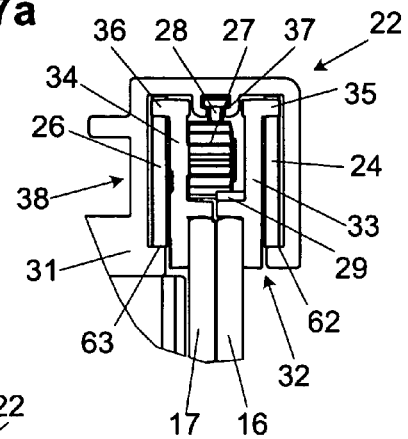
FIG. 7a represents an enlarged detail view of the circled portion A of FIG. 7.

FIG. 7*a*, which represents an enlarged detail view of the upper right-hand corner of the draft protection device 1 of FIG. 7, specifically the circled portion A of FIG. 7, offers a view into the cage 22. The cage 22 is preferably made of one piece. Materials to be considered for the cage include metals, particularly aluminum, or a polymer material. The cage 22 is attached at the upper end of the rear compartment 10 through a lateral projection 31. A slot 32 in the bottom of the cage 22 extends over the latter's entire length. The two side window sections 16, 17, which are laterally offset from each other, reach into the slot 32. The upper edges of the window sections 16, 17 are joined, respectively, to upper guide elements 33, 34 (also see FIGS. 5 and 6) of a polymer material. Each of the upper guide elements has at its forward and rearward end (relative to the working position of the balance) a space holder 35, 36 which is fitted and guided with little free play in the space between the adjacent wall of the cage 22 and a guide rail 37 extending in the middle along the top of the inside of the cage 22. The guide rail 37 itself holds the rack 28 of FIGS. 3 to 6 which consists preferably of a polymer material. The rack 28 is in meshing engagement with the pinion gear 27 which is arranged on the guide element 34 of the window section 17 on the side that faces towards the interior of the cage 22. The pinion gear 27 is attached to the guide element 34 through a rotary support and is furthermore in meshing engagement with the rack 29, with the latter being attached to the guide element 33 of the window section 16. Preferably, the window sections 16, 17 are joined to their respective guide elements 33, 34 by adhesive bonding.

The wheels 23, 24, 25, 26 are arranged on the outsides of the upper guide elements 33, 34, held by rotary bearings at the forward and rearward ends of the guide elements 33, 34. Only two wheels 24, 26 can be seen in FIG. 7*a*. Each of the wheels rolls on a ledge 62, 63 of the cage 22.

The track groove 38 for the two window sections 18, 19 of the top window 13 can be seen on the left side of FIG. 7*a*.

Figure 7B:
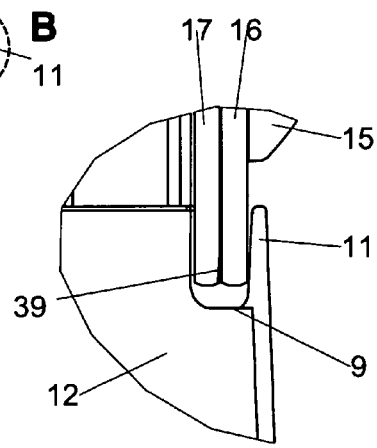
FIG. 7b represents an enlarged detail view of the circled portion B of FIG. 7.

Representing an enlarged view of the circled detail B of FIG. 7, FIG. 7*b* illustrates how the two window sections 16, 17 are arranged relative to the base 12. As can be clearly seen, the two window sections 16, 17 which are suspended from the cage 22, have no contact with the horizontal ledge 9 of the base 12 and are guided only by the upstanding ridges 11. The window sections 16, 17 are guided in the cage 22 with virtually no play, which keeps the window sections from tilting about an axis perpendicular to the plane of the window and also constrains mobility in the vertical direction. Swaying about an axis in the lengthwise direction of the cages 22 is constrained by the ridges 11. Nevertheless, the way in which the ridges 11 are arranged on the base leaves enough play for the window sections 16, 17 so that they will not get jammed when they are reinserted after they have been taken out.

In order to maintain a defined spacing between the panels of the window sections 16, 17 over their entire vertical height, a thin, about 5 mm wide gliding tape 39, preferably of a polymer material, is applied along the bottom of one of the panels. The gliding tape 39 keeps the window sections 16, 17 spaced apart from each other with a small gap which should, however, be as narrow as possible in order to keep air drafts from entering the weighing compartment when the latter is in a closed condition.

Figure 8:
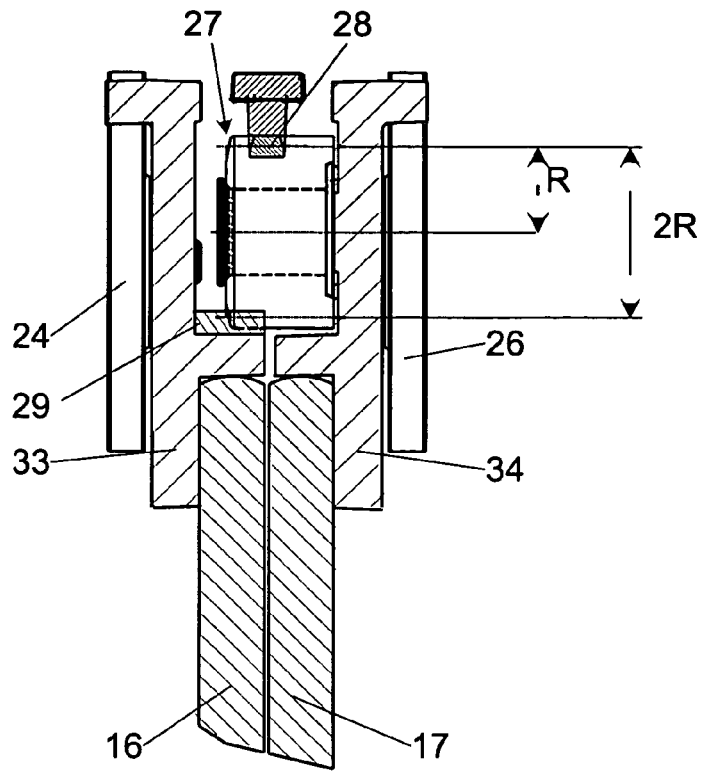
FIG. 8 represents a sectional view of the drive mechanism and parts of the guiding device of FIG. 7a in a first embodiment of the invention.

FIG. 8 gives a sectional view of the drive mechanism and parts of the guiding device with the cage 22 omitted from the drawing. Represented is the drive mechanism that drives the window sections 16, 17 of the window 6 that is shown on the left-hand side in FIG. 7. The pinion gear 27 which on the one hand meshes with the rack 28 and on the other hand with the rack 29 is rotatably attached to the guide element 34 of the window section 17. In the illustrated arrangement, the window section 16 moves at twice the speed of the window section 17 when the window 6 is opened and closed, consistent with the ratio between the diameter D=2R and the radius R of the pinion gear 27, i.e., 2:1.

Figure 9:
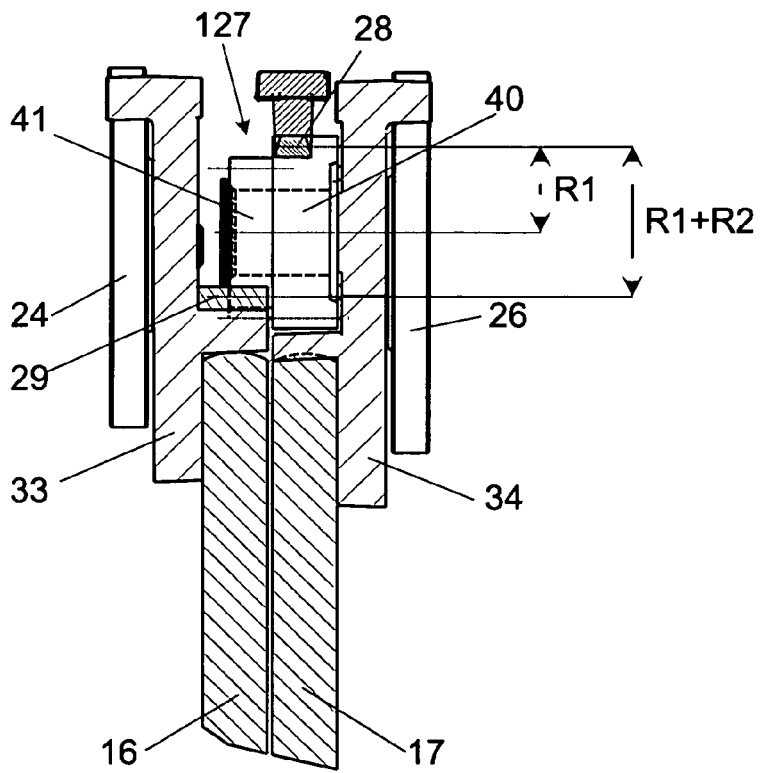
FIG. 9 represents a sectional view of the drive mechanism of FIG. 7a in a second embodiment of the invention.

FIG. 9 shows a different embodiment of the drive mechanism in a representation that is analogous to FIG. 8, but where the speed ratio between the two window sections in FIG. 9 is different from 2:1. The pinion gear 127 is divided into two sections with a step in the radius, where a first gear section 40 with a radius R1 is in meshing engagement with the rack 28 and a second gear section 41 with a radius R2 is in meshing engagement with the rack 29. In the process of opening and closing the window 6, when the rack 29 together with the window section 16 is moved over the pinion gear 127, the latter will roll along the rack 28 and move in the same direction as the rack 29. The speed of the rack 29 and connected window section 16 is in this case proportional to the sum of the radii of the two gear sections 40, 41, i.e., proportional to R1+R2, while the speed of the pinion gear and connected window section 17 is proportional to the radius R1. With this concept, it is possible to realize any desired speed ratio between the window sections 16, 17 which move together, which makes it possible to meet geometric design requirements such as the size of a window section and/or a desired travel path length. With two or more stepped gear pinions 127, one can also realize arrangements with more than two window sections that move with a desired speed ratio for the opening and closing of the window of the draft protection device.

Figure 10:
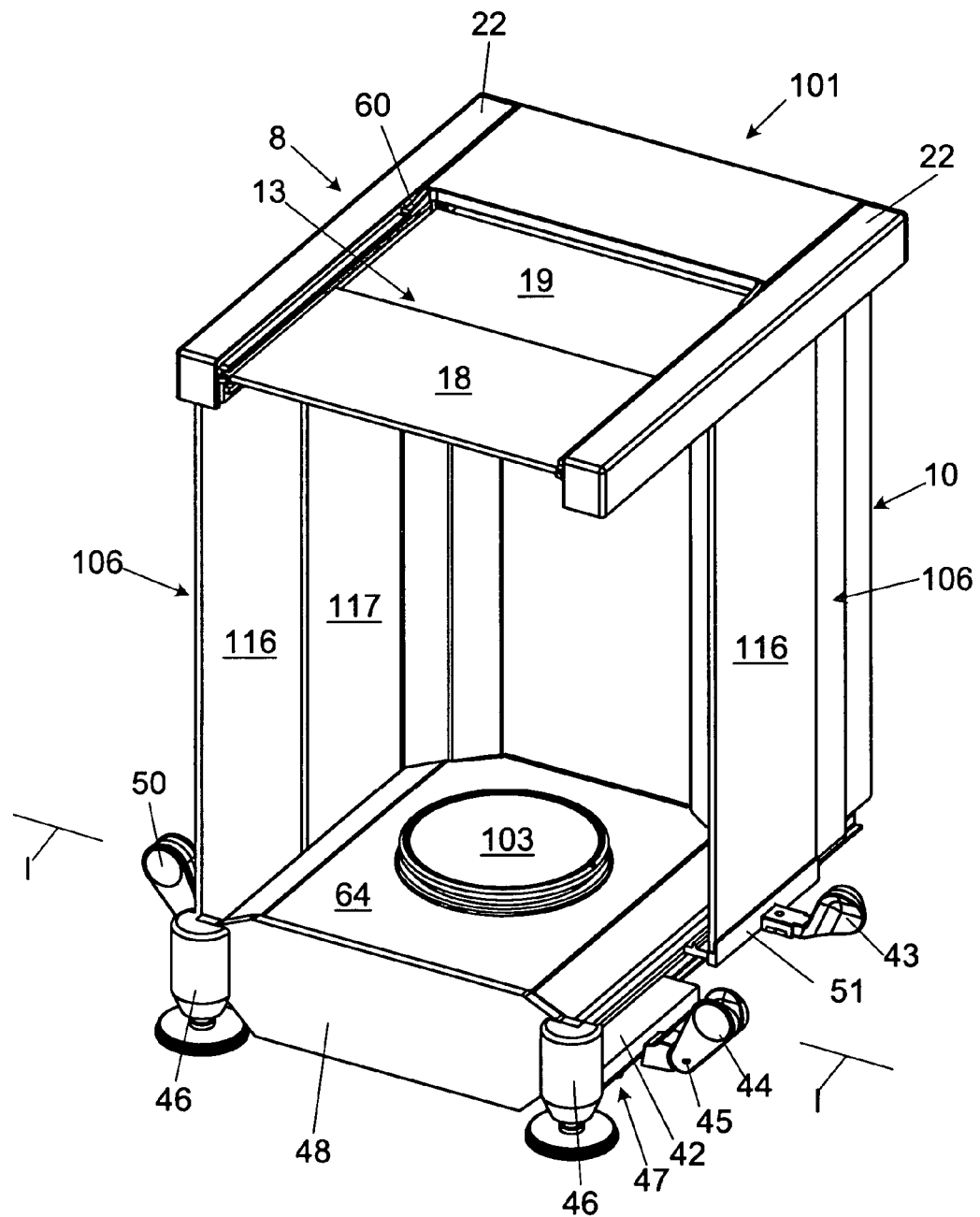
FIG. 10 represents a perspective view of a further embodiment of a balance with a draft protection device according to the invention with the weighing compartment opened on one side.

FIG. 10 offers a perspective view of a further balance that is equipped with a draft protection device 101 according to the invention, seen at an angle from the front. For the sake of clarity, the front wall has been omitted, thereby opening the view into the weighing compartment in which the weighing pan 103 is located. To the extent that the parts of the balance are the same as in FIGS. 1 to 9, they have been given the same reference symbols and their description is not repeated in the present context. The right-hand window 106 in the drawing is partially open, while the left-hand window is completely closed. In the area of the roof portion 8 and the cages 22, the draft protection device 101 resembles the draft protection device 1 of FIGS. 1 and 2. The drive mechanism and the guiding device of the window sections 116, 117 are likewise analogous to the drive mechanism and the guiding device that have been described in the context of the preceding drawing figures.

The draft protection device 101 of the balance shown in FIG. 10 does not have a base to connect it to the balance housing, but is attached directly to the balance housing 48. The latter stands on three feet, of which the two height-adjustable leveling feet 46 at the front of the balance are visible in FIG. 10.

The window section 116 of a balance that has been set up for operation has a holder 51 at the bottom edge with a first handle element 43 attached to it. A second handle element 44 is arranged on a take-along element 42 and can be flipped up and down on an axle 45 that passes through an off-center location of the handle element 45. The two handle elements 43, 44 can be coupled to each other so that they form a push handle 50, whereby the window section 116 is coupled to the take-along element 42. The latter is part of a carriage 47 that extends below the balance housing 48 all the way to the opposite side where another take-along element and second handle element 44 are attached to the carriage 47 (see below in the context of FIG. 12). The handle elements 43, 44 on the left-hand side of FIG. 10 are coupled together so that they form a push handle 50. This design concept allows the two side windows 106 to be coupled together or released from each other as needed. With the carriage 47, the push handles 50 on each window 106, and the grip elements 44, one can move either both side windows 106 together at the same time or move one window by itself by pushing the handle element 44 on the opposite side, depending on which coupling position is used. A draft protection device with this kind of push handle 50 is described in detail in US 2003/0188898.

As may be seen in FIG. 10, the balance housing 48 is designed so that dirt which could accumulate on the cover plate 64 of the floor space can cause no harm in the area of the lower guide tracks of the windows 106, because the latter are arranged below the floor cover plate 64. The holders 51, 52 of the window sections 116, 117 are engaged in track grooves below the floor cover plate 64. Consequently, substances that have fallen off the weighing pan 103 can be swept out of the weighing compartment, i.e., off the floor cover plate 64, with no problem. In the open position of the draft protection device 101 where the window sections 116, 117 cover the side wall 20 of the rear compartment 10, none of the parts that serve to guide the windows are protruding beyond the cover plate 64 of the floor space.

Figure 11:
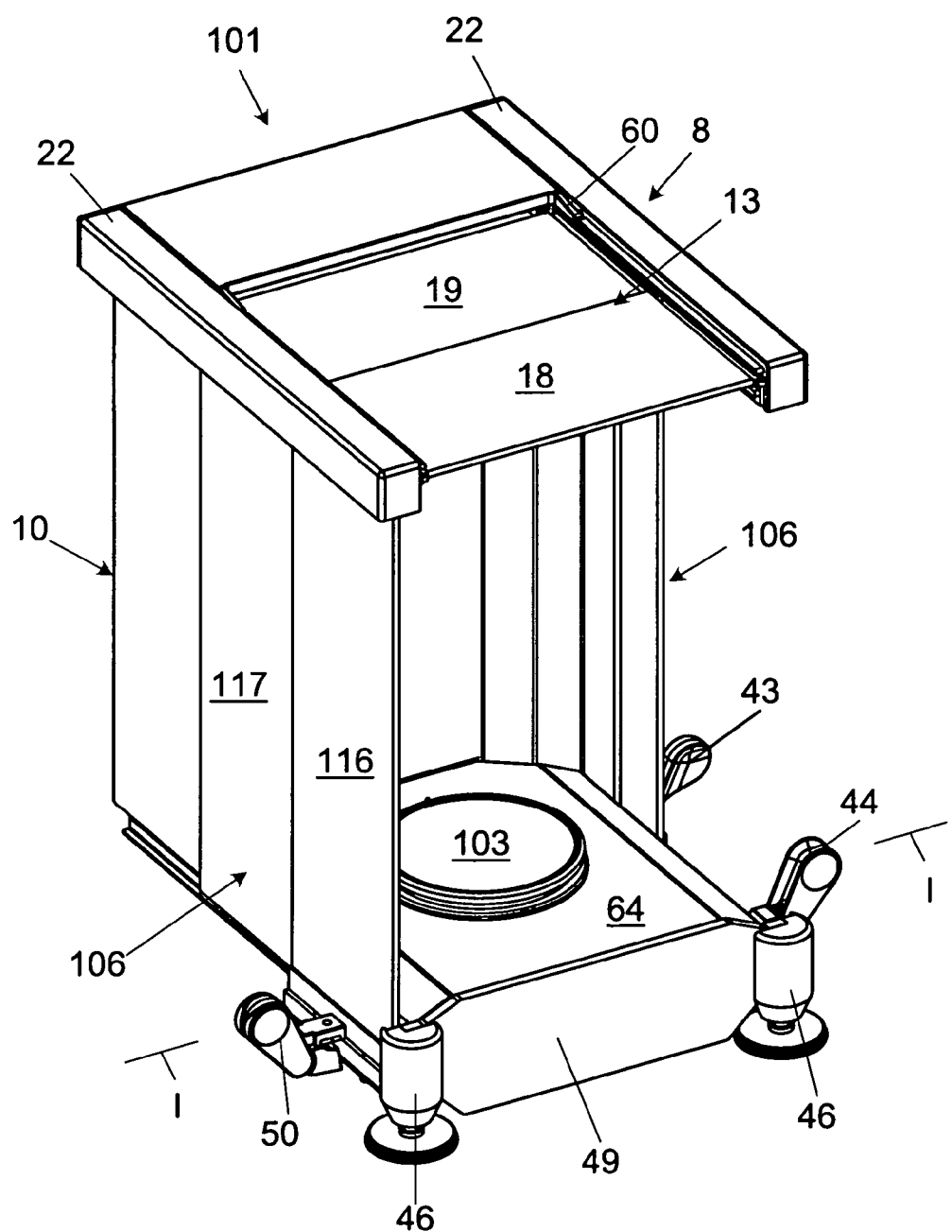
FIG. 11 represents a perspective view of the balance of FIG. 10, seen from a different angle.

FIG. 11 shows the balance of FIG. 10 in perspective, with the view directed at the closed window 106. It can be clearly seen how the handle elements 43, 44 are coupled together in the push handle 50. In this condition, the left-hand window 106 can be opened and closed either with the push handle 50 on the left side or with the handle element 44 on the right side.

Figure 12:
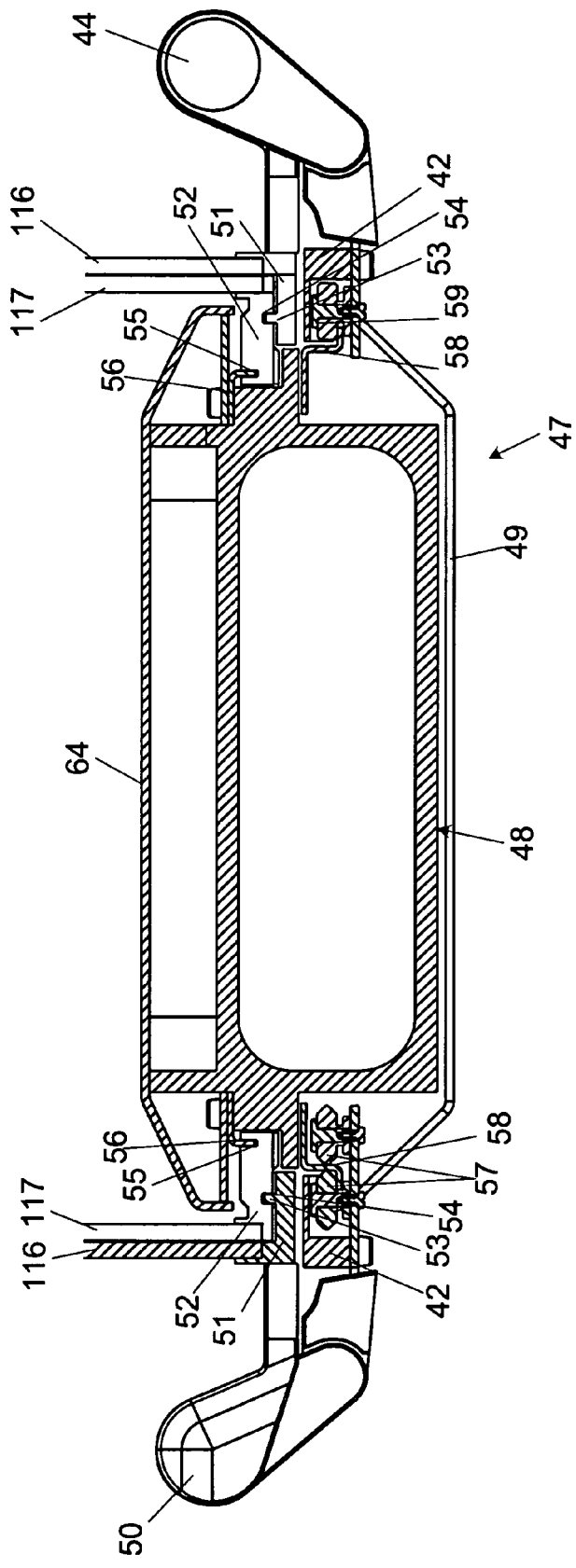
FIG. 12 represents a sectional view of a detail of the lower part of the balance of FIG. 10 or 11.

FIG. 12 represents part of a section along the line I-I of the balance shown in FIGS. 10 and 11, illustrating how the window sections 116, 117 are held and guided at the underside of the balance. Each of the window sections 116, 117 has a holder 51, 52 at its bottom edge. The holder 51 of the window section 116 has a projection 53 engaging a first groove 54 on the holder 52 of the window section 117. A second groove 55 on the holder 52 is engaged by a rail 56 attached to the housing 48. When the window section 116 is moved, the holder 51 glides along the holder 52 which, in turn, glides along the rail 56.

The carriage 47 has a connector element 49 which is screwed to the underside of each of the two take-along elements 42 and thus tying the two take-along elements 42 together. The carriage 47 is guided on one side by means of two roller pairs 57 (only one of which is visible on the left-hand side in the drawing) which are arranged in a recess of one of the take-along elements and which run along an S-shaped sheet metal guide 58 that is attached to the balance housing. On the opposite side, the carriage 47 is held by two rollers 59 (only one of which is visible on the right-hand side in the drawing) which run likewise along an S-shaped sheet metal guide and are arranged in their respective take-along element 42. The rollers 59 and roller pairs 57 are preferably arranged in the vicinity of the forward and rearward end of the respective take-along element 42.

Due to the suspension guide arrangement of the window sections 116, 117, there is no load on the guide arrangement at the bottom.

It is considered self-evident that instead of the roller pairs 57 and the rollers 59, one could use any other guiding constraint to hold the carriage 47 stable and prevent it from getting jammed in a skewed position.

It has been shown that the draft protection device 1, 101 according to the invention can be used in balances of the most diverse design configurations. The drive mechanism, in particular, is not limited to an arrangement in which racks and pinions work together. It is also conceivable to use a rope and pulley drive or a belt or spur-belt drive. The drive mechanism can be motorized as well as manually operated.

The guiding and drive arrangement can also be used for the window sections 18, 19 of the top window. However, a guide arrangement according to the existing state of the art is preferable for the top window. The concept of the present invention also encompasses guide arrangements with curved configurations for window sections with curved panels. This applies in particular to a cylindrical draft protection device as a special embodiment with curved window panels.

Furthermore, the number of window sections for opening and closing the draft protection device is not limited to two. There can also be three and in some cases even more window sections in an arrangement to close off a lateral opening or a top opening of a draft protection device for a balance.

We claim:

1. A device for protecting a balance from a draft, the balance having a weighing compartment surrounding a weighing pan, the device comprising:
    a body that encloses the weighing compartment, said body defining at least one opening;
    a window for closing each said opening, each window comprising at least two window sections which are slidable and partially overlap each other in an open position, in a closed position, and in positions therebetween; and
    a means for driving the opening and closing of each window, the driving means coupling the window sections to move simultaneously during opening and closing, the window sections moving at different speeds, the respective speeds being in a predetermined fixed ratio.

2. The draft protection device of claim 1, wherein:
    the speed of each window section during opening and closing decreases with increasing proximity of the window section in the closed position to the open position.

3. The draft protection device of claim 2, wherein:
    the respective speeds of the window sections during the opening and closing are in the same ratio as the respective distances that the window sections travel from the closed position to the open position.

4. The draft protection device of claim 1, wherein:
    the respective speeds of the window sections during the opening and closing are in the same ratio as the respective distances that the window sections travel from the closed position to the open position.

5. The draft protection device of claim 3, further comprising:
    a roof portion of the body with a top opening;
    a top window for closing the top opening;
    at least one side opening in the body; and
    a side window for closing each said side opening.

6. The draft protection device of claim 4, further comprising:
    a roof portion of the body with a top opening;
    a top window for closing the top opening;
    at least one side opening in the body; and
    a side window for closing each said side opening.

7. The draft protection device of claim 5, further comprising:
    a guiding device for each side window, proximate to the roof portion, from which each window section of each side window is suspended.

8. The draft protection device of claim 6, further comprising:
    a guiding device for each side window, proximate to the roof portion, from which each window section of each side window is suspended.

9. The draft protection device of claim 7, further comprising:
    a cage, which surrounds at least one of the guiding device and the driving means for one of the side windows, the cage also serving as a guide for the top window.

10. The draft protection device of claim 9, wherein:
    the driving means comprises a body-mounted fixed rack, a rack connected to one of the window sections, and a pinion gear in meshing engagement with each of the racks.

11. The draft protection device of claim 1, wherein:
    the driving means comprises a body-mounted fixed rack, a rack connected to one of the window sections, and a pinion gear in meshing engagement with each of the racks.

12. The draft protection device of claim 9, wherein:
    the driving means comprises at least one of: a drive belt, a spur belt, and a rope and pulley arrangement.

13. The draft protection device of claim 1, wherein:
    the driving means comprises at least one of: a drive belt, a spur belt, and a rope and pulley arrangement.

14. The draft protection device of claim 7, wherein:
    at least one wheel, located in the guiding device and connected to one of the window sections of each side window, guides and supports the window section in the guiding device.

15. The draft protection device of claim 10, wherein:
    at least one wheel, located in the guiding device and connected to one of the window sections of each side window, guides and supports the window section in the guiding device.

16. The draft protection device of claim 1, wherein:
    at least one window comprises three window sections.

17. The draft protection device of claim 7, wherein:
the window sections of at least one side window are adapted for removal from the guiding device in which they are suspended.

18. The draft protection device of claim 7, wherein:
each guiding device is adapted for removal from the body, together with the side window suspended from the guiding device.

19. The draft protection device of claim 1, wherein:
at least one window section comprises glass or a transparent polymer material with a conductive coating.

20. A balance, comprising:
a balance housing; and
the draft protection device according to claim 1, with a base adapted to be set into position on the balance housing.

21. A balance, comprising:
a balance housing; and
the draft protection device of claim 1, arranged directly on the balance housing.

22. The balance of claim 20, further comprising:
a guiding device for each side window, the guiding device arranged and configured in a lower portion of the balance such that none of its parts protrude beyond either the draft protection device or the balance housing when the respective side window is in the open position.

23. The balance of claim 21, further comprising:
a guiding device for each side window, the guiding device arranged and configured in a lower portion of the balance such that none of its parts protrude beyond either the draft protection device or the balance housing when the respective side window is in the open position.

24. The balance of claim 22, wherein:
each guiding device provides for at least one of: operating one of the side windows from the opposite side of the balance, and opening or closing both side windows simultaneously.

25. The balance of claim 23, wherein:
each guiding device provides for at least one of: operating one of the side windows from the opposite side of the balance, and opening or closing both side windows simultaneously.

* * * * *

UNITED STATES PATENT AND TRADEMARK OFFICE
CERTIFICATE OF CORRECTION

PATENT NO.         : 7,531,759 B2                                        Page 1 of 1
APPLICATION NO. : 11/185765
DATED                 : May 12, 2009
INVENTOR(S)       : Lüchinger et al.

It is certified that error appears in the above-identified patent and that said Letters Patent is hereby corrected as shown below:

On the title page, section (54), please delete "DRAFT PROTECTION DEVICE FOR A BALANCE" and insert -- DRAFT PROTECTION DEVICE FOR A BALANCE WITH TELESCOPING, DUAL SPEED DOORS --.

Signed and Sealed this

Ninth Day of June, 2009

JOHN DOLL
*Acting Director of the United States Patent and Trademark Office*

UNITED STATES PATENT AND TRADEMARK OFFICE
CERTIFICATE OF CORRECTION

PATENT NO.       : 7,531,759 B2
APPLICATION NO.  : 11/185765
DATED            : May 12, 2009
INVENTOR(S)      : Lüchinger et al.

It is certified that error appears in the above-identified patent and that said Letters Patent is hereby corrected as shown below:

On the title page, section (54) and Column 1, lines 1 and 2, please delete "DRAFT PROTECTION DEVICE FOR A BALANCE" and insert -- DRAFT PROTECTION DEVICE FOR A BALANCE WITH TELESCOPING, DUAL SPEED DOORS --.

This certificate supersedes the Certificate of Correction issued June 9, 2009.

Signed and Sealed this

Seventh Day of July, 2009

JOHN DOLL
*Acting Director of the United States Patent and Trademark Office*